March 3, 1931.          F. G. HUGHES          1,794,772
ANTIFRICTION BEARING AND CAGE Filed Jan. 11, 1928

INVENTOR:
FREDERICK G. HUGHES,

BY Gales P. Moore
HIS ATTORNEY.

Patented Mar. 3, 1931

1,794,772

UNITED STATES PATENT OFFICE

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

ANTIFRICTION BEARING AND CAGE

Application filed January 11, 1928. Serial No. 245,923.

This invention relates to antifriction bearings and comprises all the features of novelty herein disclosed, by way of example, in connection with a cage or separator for the balls of a double row bearing.

An object of the invention is to provide an improved ball cage adapted more especially for use in a double row bearing or in an angular contact bearing. Another object is to provide a two-piece cage of sheet metal which is light and strong and capable of easy assembly with a row of balls by introduction of both pieces from one end of the bearing. Another object is to provide an improved two-piece cage which is capable of having its sections fastened together without distortion and which will facilitate the assembly and fastening operation on the sections of a second cage of a double row bearing. Another object is to provide an improved double row bearing having one-piece race rings.

To these ends and also to improve generally upon devices of the character indicated the invention consists in the various matters hereinafter described and claimed.

In the drawings Figure 1 is a cross sectional view of a portion of a double row bearing, the right half of the figure being conventionalized to the extent that the ball is shown at the high point of the bearing where the section of the cage is taken in a plane between the ball pockets.

Figure 1:
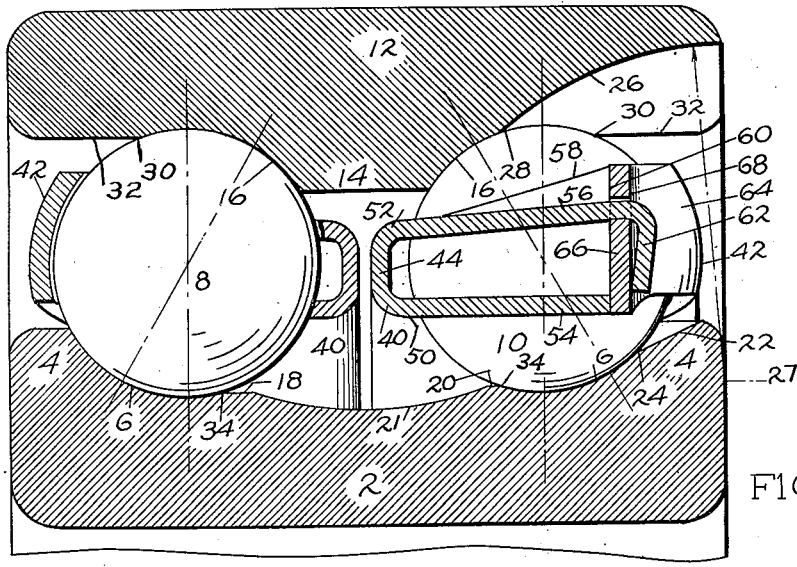
Figures 2, 3:
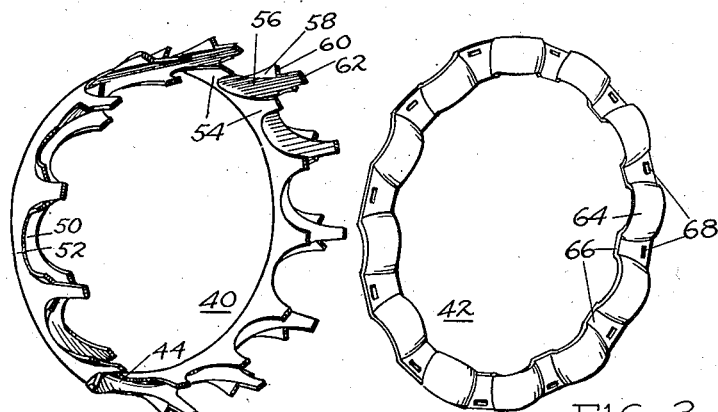
Figure 2 is a perspective view to a smaller scale of one of the cage sections.
Figure 3 is a perspective view of the other cage section.
Figure 4:
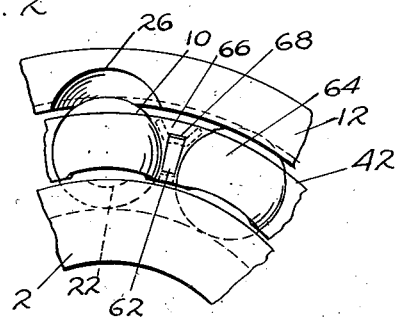
Figure 4 is a side view of a portion of the bearing.

In Figure 1, the numeral 2 indicates a race ring having, at the ends, thrust shoulders 4 on the inner sides of which are ground raceways 6, for two rows of balls 8 and 10. Another race ring 12 has a central rib 14 projecting between the rows of balls with raceways 16 on each side. In the illustrated construction, the race ring 2 is an inner race ring and the race ring 12 is an outer race ring. The inner race ring 2, or whichever race ring has the thrust shoulders at the ends, preferably has the raceways 6 curved past the vertical center lines of the balls to meet shallow cylindrical faces or ribs 18 and 20, the race ring having a central annular groove or depression 21 between the ribs, the groove being a little deeper radially of the bearing than the raceways 6, but having its bottom spaced from the rib 14 a distance less than ball diameter. The rib 18 which is ground to size is a snap rib which projects radially towards the other race ring and, when placed on the inner race ring, as shown, is of larger diamater than the innermost depths of the adjacent raceway. The rib 20 may be higher than the rib 18.

One end of the race ring 2 preferably has a slot 22 cut through the shoulder 4 on a slant to intersect the raceway 6 at the point or rib 24. A complementary filling slot 26, curved transversely, is cut in one end of the other race ring 12 though either slot alone may be made sufficiently deep to admit the balls one by one. The slot 26 intersects the adjacent raceway 16 at a point or rib 28 which ordinarily lies at the inner side of the vertical center line of the balls 10. Neither filling slot extends to the bottom of its raceway 6 or 16. The center of transverse curvature of the slot 26 preferably lies at a point 27 in the side of the bearing. The distance between the entrance ends of the cooperating slots is slightly greater than ball diameter to let the ball enter freely but the location of the center of curvature 27 is such as to produce a gradual construction in the size of the ball opening as the ribs 24 and 28 are approached. The curvature also enables the balls to be passed over the uncut portion of shoulder 4 while still leaving plenty of material in the outer race ring outside the slot; a straight slot at 26 would require a deeper slot at 22. As viewed from the entrance end of the filling opening, the curvature of the slots is slightly greater than the ball radius. Each raceway 16 is preferably carried around to the outside of the vertical center line of the balls to meet at 30 a land or rib 32 which overhangs the balls, the land which overhangs the balls 8 being wholly uninterrupted by a filling slot. The radial distance between the land 32 and the bottom of the central groove 21 is larger than ball diameter but the radial distance between the land 32 and the face or rib 18 is less than ball diameter for assembly reasons as will appear. Confronting angular contact raceways are thus produced with a snap entrance for the balls 10 between the points 24 and 28, the point 24 preferably presenting a higher projection to the entrance or escape of the balls in the assembled bearing because, under load, the ball contact ellipses on the inner ring are longer.

According to one method of assembly, one row of balls, as 8, is placed in the central groove 21 and a cage applied while the outer race ring is removed. Then the inner race ring (with its balls and cage) is moved axially to the right (as viewed in Figure 1) into the outer race ring, the balls 8 (then lying in the central groove 21) passing freely inside the land 32 and engaging the left raceway 16 and being forced by it as a group over the snap rib 18 into the adjacent raceway 6. This snap assembly will hold the parts of the bearing together for further handling and, by having each raceway 6 extended to a point 34 on the rib 18 or 20, the balls are supported on both sides of their vertical center lines. After inserting the inner member of a two-piece cage which is hereinafter described, the balls in the row 10 are inserted one by one through the filling slots, ring 2 meanwhile being somewhat distorted by extraneous forces so as to increase the ease of insertion without marring the balls. Although the inner race ring is mentioned as being the one to be moved for assembly purposes, any relative axial movement of the race rings may be employed.

The two rows of balls are shown as having like cages, though like cages are not essential. In a double row bearing of the general character indicated, it is apparent that completed cages or retainers cannot be applied to both rows of balls before the balls are inserted between the races. This follows because the balls 10 in the second row must be inserted one by one. It is also apparent that this type of bearing puts many severe limitations on the kind of cage that can be used especially as regards the cage for the second and last row of balls. A cage or retainer, as distinguished from a mere separator, is desired because it will help prevent the balls from working out at the filling slots but a cage or retainer must be closed over the balls, or its sections fastened together, and the inner side is practically inaccessible in a double row bearing for fastening operations which always tend to distort a cage. Again, the central rib 14 restricts the radial depth of a cage in one direction and the thrust shoulders 4 restrict the radial depth in another direction. It will still further appear that fastening operations on the second cage necessitate, or render very desirable, a special construction in the first cage. All of these requirements restrict the possibility of producing a light strong cage which will properly guide and hold the balls and work with minimum friction.

Each cage shown herein comprises two sections or rings 40 and 42, the first having a continuous radially extending flat back or base portion 44 merging with laterally extending flanges 50 and 52 which have their edges curved to form ball pockets and which space the base portion from the balls and bring it close to the center line of the bearing. The pockets in one flange, as 50, also form seats for the balls. This part of the cage must be of such internal diameter as to pass over the shoulder 4 and of such external diameter as to have proper running clearance with the rib 14. The radial depth necessarily being small, this part of the cage is made of box-like or skeleton form, preferably being U-shaped in cross section for strength and the radially extending base or back is continuous and flat to form an abutment as will appear. The flange 50 is extended axially between the balls to make a series of cross struts 54 which extend past the vertical center line of the balls and conform to them as far as the center line. The other flange 52 is extended between the balls to make a series of cross struts 56. Each strut 56 comprises a central substantially straight portion and side wings 58, the latter preferably extending outwardly and conforming to the balls as far as the vertical center line but not touching them. The central portions of the struts diverge outwardly a little with respect to the struts 54 and to the bearing axis while the wings 58 also gradually increase in height to a point past the center line where they terminate in abutment edges 60. The cross section is a gradually deepening U or trough formation which stiffens the strut. When bent outwardly, the wings take advantage of the increased space available outside the rib 14 to enclose more of the ball area. The struts 56 are narrow circumferentially and are located outside the circle through the ball centers to allow close approach of the balls and so increase the capacity of the bearing. The struts constitute ball spacers and retainers and each has a bendable tab 62 at the end to fasten the cage section to another cage section, as will appear.

The other cage section or ring 42 has curved ball pockets in its side wall 64 which is of greater radial extent than the base portion 44 of the other ring. The ring 42 is provided between the balls with a series of flat radially extending webs 66 abutting against the ends of the struts 54 and 56. The webs 66 are of greater radial extent, towards the raceway 6, than the side wall 64. Each web 66 has an opening 68 through which the tabs 62 are passed and bent over to hold the sections together. Thus the two ring sections of the cage are connected and braced by a series of hollow box like stiffening members capable of supporting heavy axial pressure and of holding lubricant.

The row of balls 8 can obviously have the cage sections applied and fastened before the balls are inserted as a group into the outer race ring. In assembling the other row of balls 10 and their cage, the cage section or ring 40 is first slipped between the race rings with its base 44 resting on the base 44 of the preceding cage, the axes of the race rings preferably being vertical and the first cage resting on a suitable base. The balls 10 are inserted one by one through the filling slots and into the ball pockets in the cage ring 40 as the latter is indexed around to receive them. Then the cage section or ring 42 is applied with the tabs 62 extending through its openings 68. The first cage with its strong frame like structure will resist distortion due to bending or clenching tools applied to the tabs 62 and the stiff struts of the second cage prevent any buckling or distortion as the narrow tabs are bent over and clenched. Hence it appears that the special requirements of the second cage also affect or call in a general way for certain qualities in the first cage, as any ordinary first cage would not stand the final clenching pressure without distortion. When the fastening pressure is released, the contacting base portions 44 of the cages will separate a little due to the elasticity of the parts and the cages will run without rubbing.

The fastening operation on the second cage can also be effected by applying a radial pressure to the tabs 62, this action pressing the cage pockets 64 towards the bearing axis and, by reaction with the balls, the second cage is held from approaching the first cage.

It will be noted that the openings 68 for the securing tabs 62 and the ball seats on flange 50 are located equidistantly between the points where the balls engage with their angular contact raceways. Hence, the cage fastenings are placed where the balls exert their greatest tendency to spread or wedge the separator sections apart and a cage of considerable rigidity results.

Figure 5:
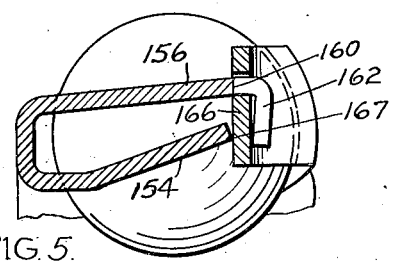
Fig. 5 is a sectional view of another form of cage.

In Fig. 5, a cage is shown with struts 154 arranged at an angle to abut the webs 166 of the outer cage section at 167. The struts 156 have no wings but arch circumferentially and there are abutment shoulders 160 at the sides of the tab 162. The angular arrangement of the struts 154 prevents them from bending towards the axis of the bearing under pressure of the balls.

I claim:

1. In a two piece ball cage for a circular row of balls, a ring having a flat, radially extending base portion with laterally extending flanges, a second ring having a side wall with ball pockets and with radial web portions between the balls, the web and pocket portions of the side wall being of greater radial extent than the base portion of the first ring, and spacing devices between the rings and separating the balls, said devices gradually increasing in radial depth from the laterally extending flanges of the first ring to the web portions of the second ring; substantially as described.

2. In a two piece ball cage for a circular row of balls, a ring having a flat, radially extending base portion, the base portion having a laterally extending flange with ball seats spacing the balls from the base portion, a series of struts extending from the flange between the balls, the struts each having a gradually deepening U-shaped cross section, a second ring having ball pockets, and means for fastening the ring against the deeper ends of the struts; substantially as described.

3. In a two piece ball cage for a circular row of balls, a ring having a radially extending base portion, a series of struts extending laterally between the balls from one edge of the ring, a series of struts extending laterally from the other edge of the ring and diverging from the first series of struts, a second ring abutting against the diverging struts and being radially deeper than the first ring, and means for securing the second ring against the struts; substantially as described.

4. In a two piece ball cage for a circular row of balls, a ring having a radially extending base portion, a series of struts extending laterally between the balls from one edge of the ring, a series of struts extending laterally from the other edge of the ring and having a gradually deepening U-shaped cross section, a second ring abutting against the struts, and means for securing the second ring against the struts; substantially as described.

5. In a two piece ball cage for a circular row of balls, a ring having a flat, radially extending base portion, the base portion having its inner and outer edges provided with flanges having ball pockets, struts extending laterally between the balls from the inner flange, struts extending laterally and outwardly between the balls from the outer flange and having their edges provided with gradually deepening side wings, a second ring radially deeper than the first ring and abutting against the struts and the ends of their side rings, and means for holding the second ring against the struts; substantially as described.

6. In a two piece ball cage, a ring having a continuous flat base portion with laterally extending flanges having ball pockets, struts extending from the flanges between the balls, a second ring having a side wall with ball pockets and radial web portions between the balls, the web and pocket portions of the side wall being of greater radial extent than the base portion of the first ring and the web portions abutting against said struts, and integral fingers on the struts bent to hold the webs and struts together; substantially as described.

7. In a two piece ball cage, a ring having a radially extending base portion at one side of a row of balls with a series of struts extending between the balls, the struts having wings bent from the sides to stiffen them and to include larger ball areas, a second ring having ball pockets and radial web portions between the balls, the web portions abutting against the struts, and means for holding the web portions against the struts; substantially as described.

8. In a two piece ball cage, a ring having a radially extending base portion at one side of a row of balls with series of struts extending between the balls, the struts in one series having a trough formation, a second ring having a side wall with ball pockets and radial web portions between the balls, the web portions abutting against said trough portions and being of greater radial extent than the pocket portions, and holding tabs extending from said struts through said webs; substantially as described.

9. In a double row ball bearing having a one-piece outer race ring and a one-piece inner race ring with one of the race rings provided with thrust shoulders at its outer edges and the other race ring having a central thrust rib, the combination of a two piece ball cage, said cage comprising a ring having a side portion of a diameter to pass over one of the thrust shoulders during assembly and to have running clearance with the central thrust rib, a second ring having a side portion of a greater radial depth than the side portion of the first ring, and integral ball spacing and retaining members at the edges of the first ring, the members at the outer edge of first ring diverging from the bearing axis to pass further outside the ball centers and enclose more of the ball areas, said divergence of the members also allowing close approach of the balls to one another, and said members constituting the sole means for fastening the first ring to the second ring; substantially as described.

10. In a double row ball bearing, a one-piece inner race ring, a one-piece outer race ring, two rows of balls, one of the race rings having a central rib and the other race ring having an annular groove opposite the rib, ball contact raceways at the sides of the rib and cooperating ball contact raceways at the sides of the annular groove, a rib projecting from one of the race rings between the annular groove and one of the adjacent raceways, the space between the central rib and the bottom of the annular groove being less than ball diameter, the raceway at one side of the central rib thereby engaging the balls in one row and forcing them as a group from the annular groove across the projecting rib into the adjacent raceway; substantially as described.

11. In a double row ball bearing, a one-piece inner race ring, a one-piece outer race ring, two rows of balls, one of the race rings having a central rib and the other race ring having an annular groove opposite the rib, ball contact raceways at the sides of the rib and cooperating ball contact raceways at the sides of the annular groove, the raceways on both race rings being carried past the vertical center lines of the balls, a rib projecting from one of the race rings between the annular groove and one of the adjacent raceways, the space between the central rib and the bottom of the annular groove being less than ball diameter, the raceway at one side of the central rib thereby engaging the balls in one row and forcing them as a group from the annular groove across the projecting rib into the adjacent raceway; substantially as described.

12. In a double row ball bearing, a one-piece inner race ring, a one-piece outer race ring, one of the race rings having a central thrust rib with outwardly facing angular contact raceways at its opposite sides, the other race ring having inwardly facing angular contact raceways with a central groove between the raceways, balls in the raceways, the central groove being separated from one of the adjacent raceways by a snap rib, and the snap rib projecting radially towards the other race ring and being nearer thereto than the deepest section of the adjacent raceway; substantially as described.

13. In a double row ball bearing, a one-piece inner race ring, a one-piece outer race ring, the outer race ring having a central rib with outwardly facing angular contact raceways at its opposite sides, the inner race ring having inwardly facing angular contact raceways with a central groove between the raceways, balls in the raceways, the central groove being separated from one of the adjacent raceways by a projecting rib of larger diameter than the inner-most depths of the adjacent raceway; substantially as described.

14. In a ball bearing, an inner race ring having a ball race, an outer race ring having an opposing ball race, the sides of the race rings having slots cut through them to intersect the raceways, the intersections of the slots with the raceways forming ribs between which the balls are passed, and the rib on the inner race ring presenting a higher projection to the entrance or escape of the balls than the rib on the outer race ring; substantially as described.

15. In a ball bearing, an inner race ring having a ball race, an outer race ring having an opposing ball race, the sides of the race rings having slots cut through them to intersect the raceways, the intersections of the slots with the raceways forming ribs between which the balls are passed, and one of the slots being curved transversely of the bearing to produce a gradual constriction in the size of the cooperating slots from the entrance ends of the slots to the ribs; substantially as described.

16. A two-piece ball cage especially adapted for a bearing in which the balls must be assembled before fastening the cage sections together, comprising two connecting rings, one ring lying wholly at one side of the center of a row of balls and having curved ball pockets in its side wall, the other ring being of box-like cross section with a plain flat back adapted to form a firm support and having, at its outer edge, narrow spacing struts separating and retaining the balls and fastened to said one ring, the spacing struts being located outside the circle through the ball centers to allow close approach of the balls to one another, the struts constituting both ball retainers and ring fasteners with their ends accessible for fastening at the outer side of said one ring while the box-like cage ring with the flat back is adapted to constitute a support for such fastening; substantially as described.

17. In a double row ball bearing having a one-piece outer race ring and a one-piece inner race ring with one of the race rings provided with thrust shoulders at its outer edges and the other race ring having a central thrust rib, the combination of a two-piece ball cage for each row of balls, each cage comprising two connected rings, the interior cage rings between the two rows being of box-like cross section with plain flat backs and narrow spacing struts spacing and retaining the balls, the outer cage rings having ball pockets and lying wholly at the outer sides of the centers of the rows of balls, and the spacing struts of the interior cage rings constituting ball retainers and ring fasteners with their ends accessible for fastening at the outer sides of the outer cage rings, the box-like cage rings being arranged back to back whereby one is adapted to form a firm support for the other; substantially as described.

18. In a double row antifriction bearing having a one-piece outer race ring and a one-piece inner race ring, two rows of rolling elements between the race rings, and a separate two-piece cage for each row of rolling elements, each cage comprising connected rings, one of the connected rings having a box-like form with a flat back and a series of spacing struts extending laterally outwards of the bearing to receive rolling elements between them when said rolling elements are introduced between the race rings, the other cage ring having pockets and lying wholly at the outer side of the centers of the rolling elements, and the struts constituting rolling element retainers and ring fasteners accessible for fastening at the outer side of said other cage ring, the two innermost cage rings being adapted to engage back to back, the one to serve as a support for fastening the rings of the other cage; substantially as described.

In testimony whereof I hereunto affix my signature.

FREDERICK G. HUGHES.